(12) United States Patent
Witt et al.

(10) Patent No.: US 11,780,577 B2
(45) Date of Patent: Oct. 10, 2023

(54) UNIBODY PARAMOTOR ASSEMBLY

(71) Applicants: Shawn R. Witt, Kirkland, WA (US); Garrett L. Reed, Clinton, MO (US)

(72) Inventors: Shawn R. Witt, Kirkland, WA (US); Garrett L. Reed, Clinton, MO (US)

(*) Notice: Subject to any disclaimer, the term of this patent is extended or adjusted under 35 U.S.C. 154(b) by 189 days.

(21) Appl. No.: 17/383,077

(22) Filed: Jul. 22, 2021

(65) Prior Publication Data

US 2022/0024576 A1 Jan. 27, 2022

Related U.S. Application Data (60) Provisional application No. 63/055,163, filed on Jul. 22, 2020.

(51) Int. Cl.
| | | |
|---|---|---|
| *B64C 31/036* | (2006.01) | |
| *B64D 37/04* | (2006.01) | |
| *B64D 27/24* | (2006.01) | |
| *B64F 5/10* | (2017.01) | |

(52) U.S. Cl.
CPC .......... *B64C 31/036* (2013.01); *B64D 27/24* (2013.01); *B64D 37/04* (2013.01); *B64F 5/10* (2017.01)

(58) Field of Classification Search
CPC ... B64C 31/036; B64C 31/024; B64C 39/026; B64C 31/00
See application file for complete search history.

(56) References Cited

U.S. PATENT DOCUMENTS

| | | | | |
|---|---|---|---|---|
| 10,562,621 | B2 * | 2/2020 | Witt | ...................... B64C 31/036 |
| D877,684 | S * | 3/2020 | Layan | .......................... D12/321 |
| D910,530 | S * | 2/2021 | Brugnolli | ..................... D12/322 |
| 2015/0217853 | A1 * | 8/2015 | Svec | ..................... B64C 39/026 |
| | | | | 244/4 A |
| 2017/0355456 | A1 * | 12/2017 | Reed | ......................... B64C 1/26 |

* cited by examiner

*Primary Examiner* — Philip J Bonzell
(74) *Attorney, Agent, or Firm* — Hovey Williams LLP; Kameron D. Kelly (57) ABSTRACT

A paramotor assembly, a unibody frame for such a paramotor assembly, and a method of making a paramotor assembly are provided. The paramotor assembly includes a monolithic, non-metallic molded body, a hoop extending at least partially around the molded body, and spars coupling the hoop and the molded body. Each of the spars includes an inner end coupled to the molded body and an outer end coupled to the hoop. The inner ends of the spars are spaced from one another and held in position relative to one another by the molded body. The method includes molding the monolithic molded body from the non-metallic material, attaching inner ends of the spars to the molded body at spaced apart inner locations, and attaching outer ends of the spars to the hoop at spaced apart outer locations.

20 Claims, 10 Drawing Sheets

UNIBODY PARAMOTOR ASSEMBLY

CROSS-REFERENCE TO RELATED APPLICATION

This application claims the benefit of priority of U.S. Provisional Patent Application Ser. No. 63/055,163, entitled "Unibody Paramotor Assembly," filed Jul. 22, 2020, the entire disclosure of which is incorporated herein by reference.

BACKGROUND

Paramotors, also known as powered paragliders, combine a traditional paraglider wing (or ram-air canopy) with a motorized frame. Paramotors may generally include a metallic frame that supports a motor with a propeller attached thereto, a hoop and netting surrounding the propeller and attached to the frame via a series of spars, and one or more flight controls such as swing arms or similar to steer the paramotor, a hand-operated throttle control the rotational speed of the motor, and other controls used to steer or otherwise control the paramotor during flight. Risers of the paraglider wing are typically attached to the frame using one of a variety of suspension systems such as fixed or pivoting underarm bar systems, no bar systems, sliding web underarm bar systems, and fixed, floating, or pivoting J-bar systems. The paramotor also includes a pilot harness used to strap the paramotor generally to a pilots back and support the pilot via an integral seat during flight.

There has been a growing demand for improved frames and other paramotor components that provide performance benefits over traditional paramotor frames and components while reducing weight, cost, and space. More particularly, there is a need for improved frames and other components of the paramotor that exhibit increased structural strength as compared to traditional metallic frames, reduced weight as compared to traditional metallic frames, that allow for the construction of advanced shapes conducive to flight, and/or that provide other performance or manufacturing benefits over traditional paramotor frames.

SUMMARY

Embodiments of the disclosure are directed to a monolithic—or unibody—molded body of a paramotor assembly that provides the structural support for mounting various flight components while, optionally, incorporating an internal fuel tank or other components. The molded body may reduce weight and increase performance while allowing for more complex aerodynamic shapes as compared to metallic paramotor frames.

For example, some embodiments of the disclosure are directed to a paramotor assembly. The paramotor assembly comprises a monolithic, non-metallic molded body; a hoop extending at least partially around the molded body; and a plurality of spars coupling the hoop and the molded body. Each of the spars includes an inner end coupled to the molded body and an outer end coupled to the hoop. The inner ends of the spars are spaced from one another and held in position relative to one another by the molded body.

Other embodiments of the disclosure are directed to a unibody frame for a paramotor assembly. The unibody frame comprises a monolithic, non-metallic molded body having an upper portion, a base disposed below the upper portion when the molded body is in an upright configuration, and an internal liquid-holding volume. The upper portion of the molded body includes a plurality of radially arrayed recesses configured to receive inner ends of a plurality of spars such that, when the inner ends of the plurality of spars are received in the plurality of recesses, the inner ends of the spars are spaced from one another and held in position relative to one another by the molded body. The internal liquid-holding volume is configured to serve as a fuel tank for the paramotor assembly.

Still other embodiments of the disclosure are directed to a method of making a paramotor assembly. The method comprises molding a monolithic molded body from a non-metallic material; attaching inner ends of a plurality of spars to the molded body at spaced apart inner locations; and attaching outer ends of the plurality of spars to a hoop at spaced apart outer locations.

BRIEF DESCRIPTION OF THE SEVERAL VIEWS OF THE DRAWINGS

Embodiments of the disclosure are described in detail below with reference to the attached drawing Figures, wherein.

DETAILED DESCRIPTION

Aspects of the disclosure relate to a unibody, or monocoque, frame used within a high-performance paramotor assembly (also referred to as a powered paraglider). More particularly, aspects utilize monocoque/unibody construction techniques in the manufacturing of the energy holding system to support the structural and flight components of the paramotor assembly. Utilizing the molded structure of the monolithic, non-metallic (e.g., plastic, carbon fiber, synthetic and/or composite fiber layup and/or weave structures, glass-reinforced plastic (GRP), 3D fiber-reinforced printed structures, and/or other suitable non-metallic materials) body to support structural and flight component of the paramotor assembly alleviates the need for a complete rigid (e.g., a welded metallic tubular structure or similar external structure) frame connecting components such as spokes, spars, cage/netting supports, engine(s), harness(es), motor(s), and flight components attaching the paraglider wing to the paramotor and supporting the paramotor on the ground.

In some embodiments, the molded unibody/monocoque construction of the body includes engineered reliefs, reinforcement ribs, and varying wall thicknesses to allow for the manufacturing of a frame that is rigid enough to support its components without the support or need of an external, metallic frame. The removal of the external, metallic frame reduces the paramotor assembly weight, allows for the construction of more advanced shapes conducive to flight, and allows for the storage of more fuel or batteries, resulting in a high-performance paramotor assembly. The removal of the external, metallic frame also allows for more cost-effective manufacturing techniques as the body can be rapidly produced from one or multiple molding processes (roto-molding, blow molding, carbon fiber and/or synthetic/composite fiber layup, additive manufacturing or 3D printing, etc.).

Unibody or monocoque paramotor construction provides certain advantages over traditional paramotor assemblies including that (1) it allows the paramotor to carry more fuel or batteries as the engineered shape allows for more capacity without the need to increase the fuel tank or battery holding system seen on traditional paramotors; (2) it allows for geometries not possible in traditional paramotor frames as the body can be designed conform to the shape of the pilot streamlining the airflow in flight resulting in higher aerodynamic performance; (3) the monolithic molded body is formed of a material that is flexible enough to absorb substantial impacts without breaking, thereby increasing crash resistance; and (4) other manufacturing and performance related benefits.

Figure 1:
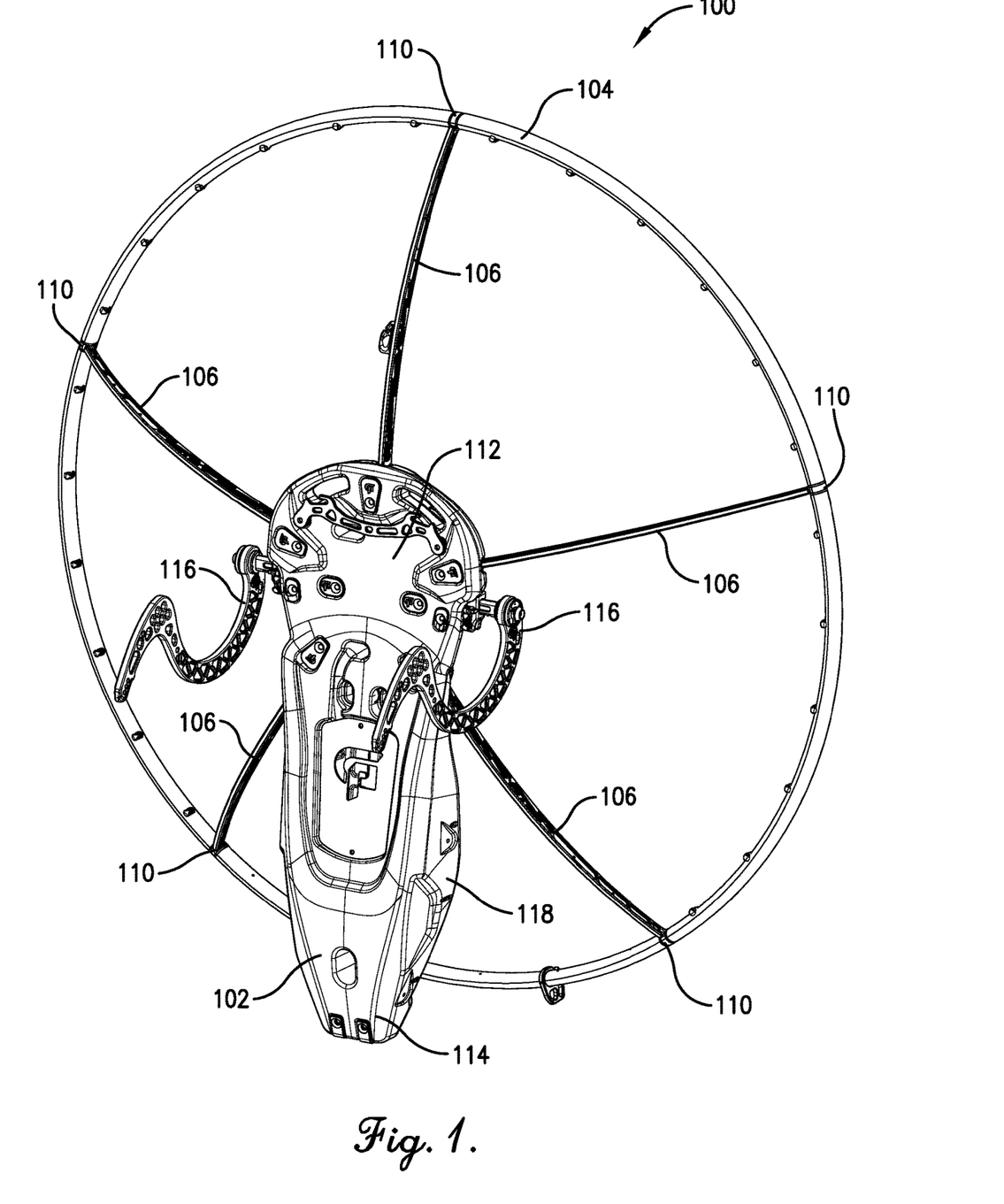
FIG. 1 is a front, perspective view of a paramotor assembly according to one embodiment.
Figure 2:
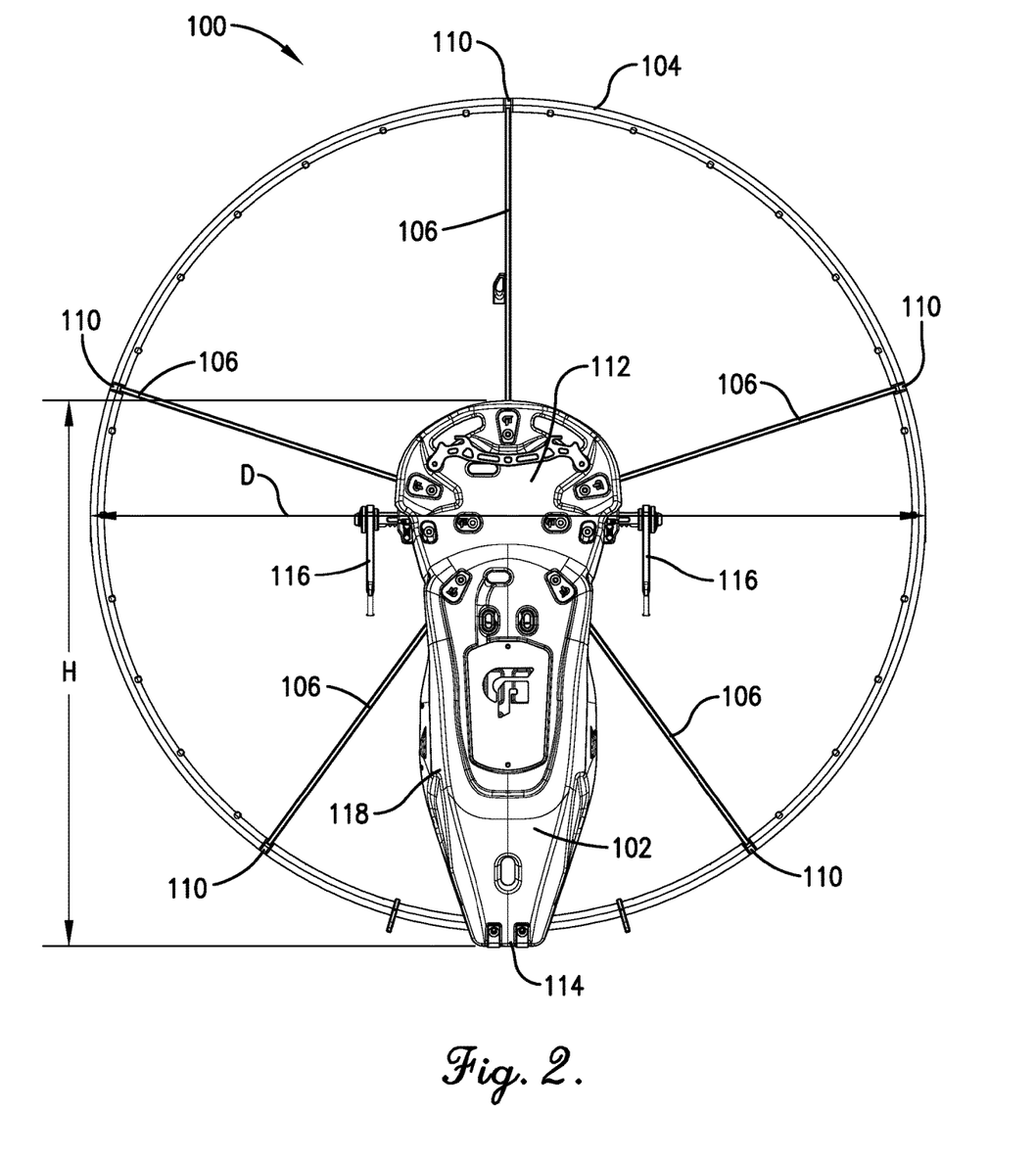
FIG. 2 is a front view of the paramotor assembly shown in FIG. 1.
Figure 3:
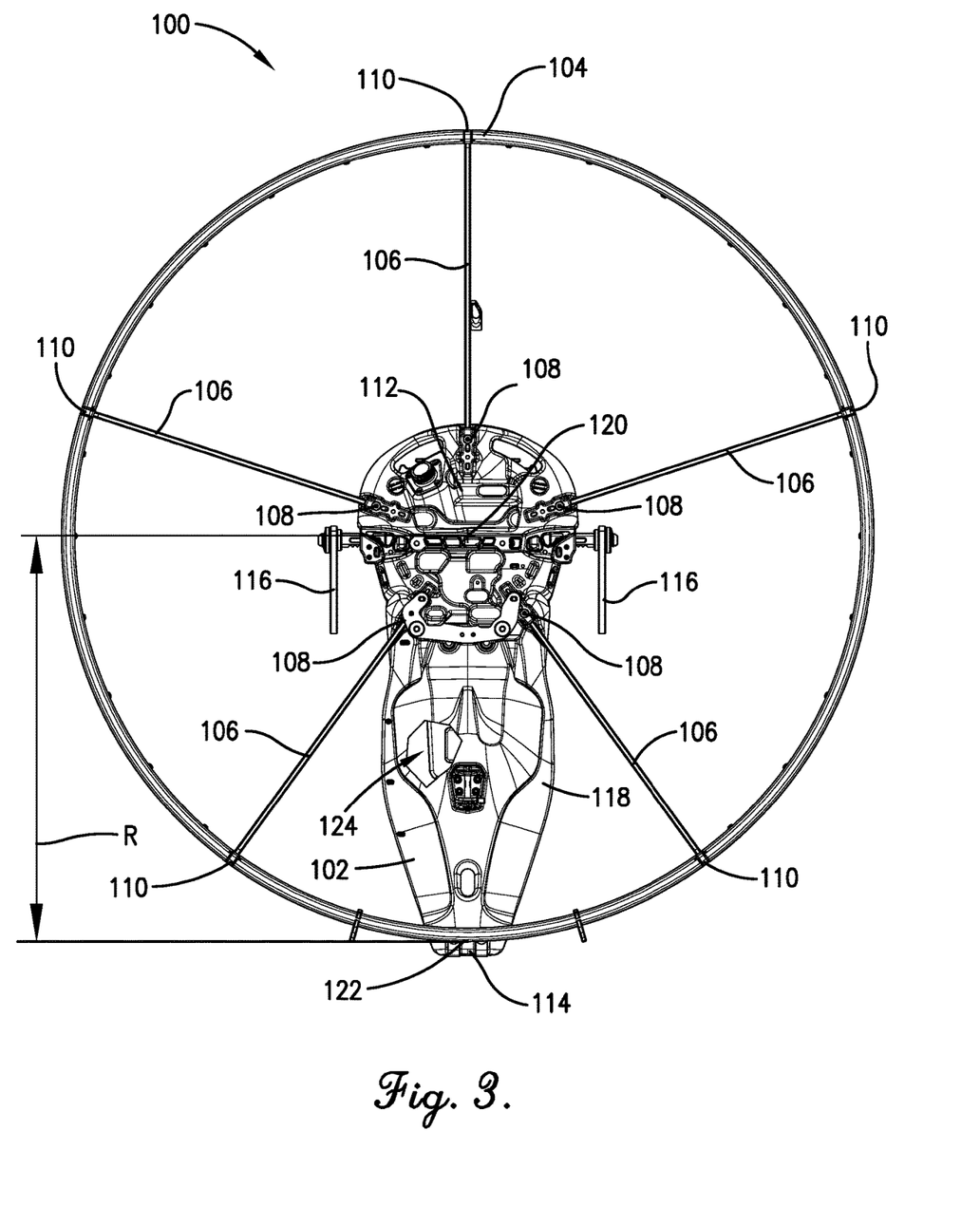
FIG. 3 is a back view of the paramotor shown in FIGS. 1 and 2.
Figure 4:
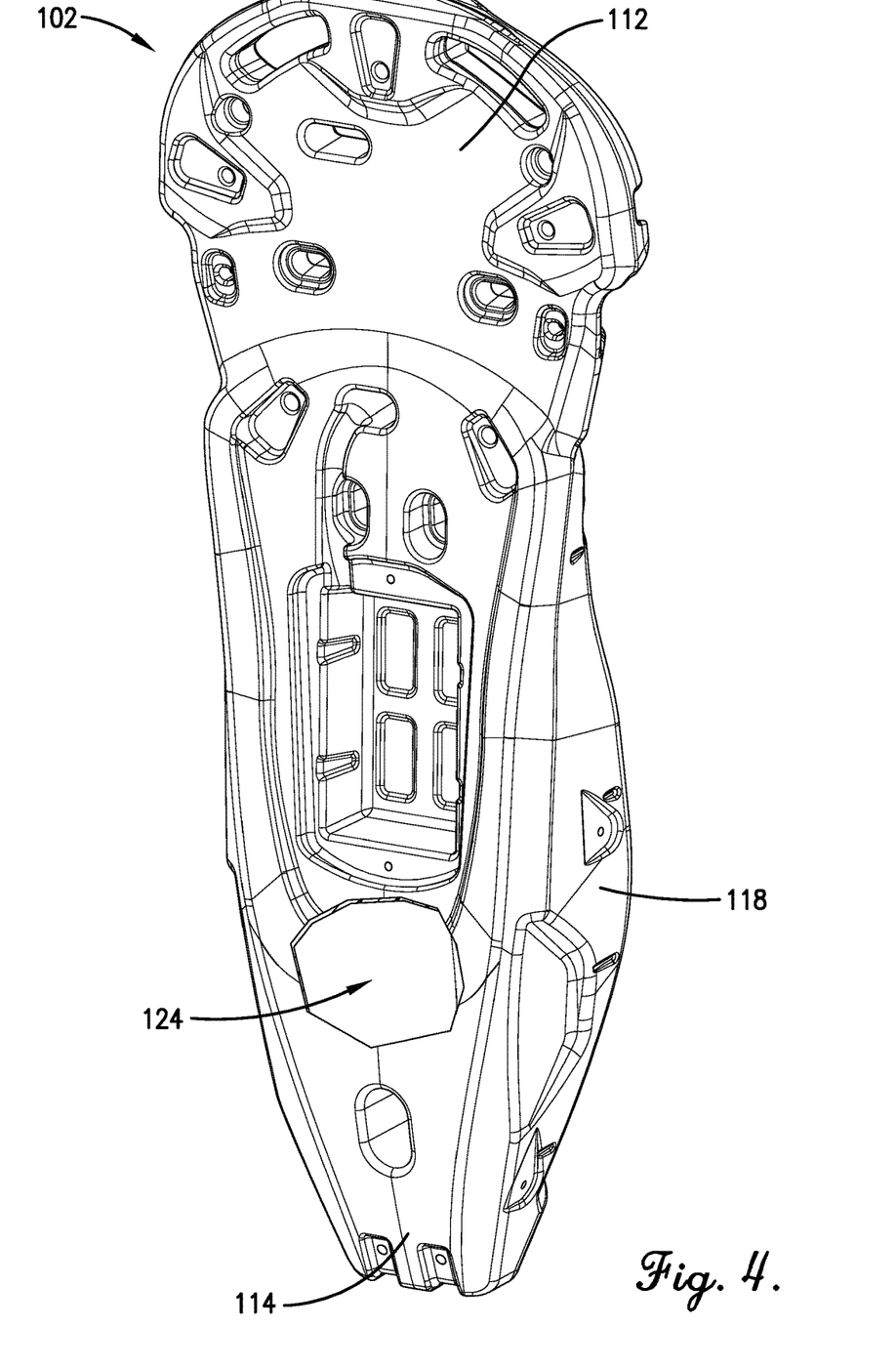
FIG. 4 is a front, perspective view of a molded body of the paramotor assembly shown in FIGS. 1-3.
Figure 5:
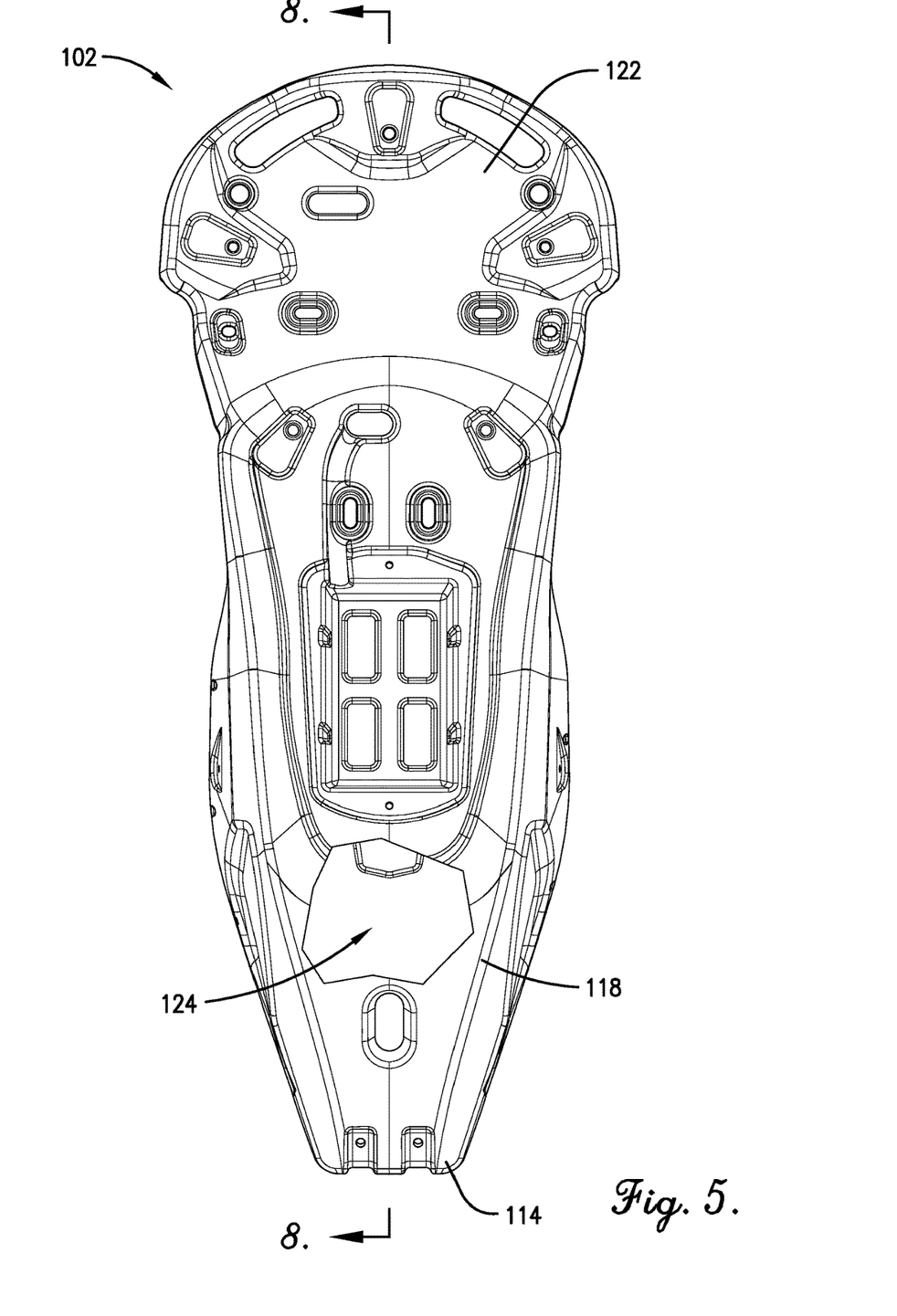
FIG. 5 is a front view of the molded body shown in FIG. 4.
Figure 6:
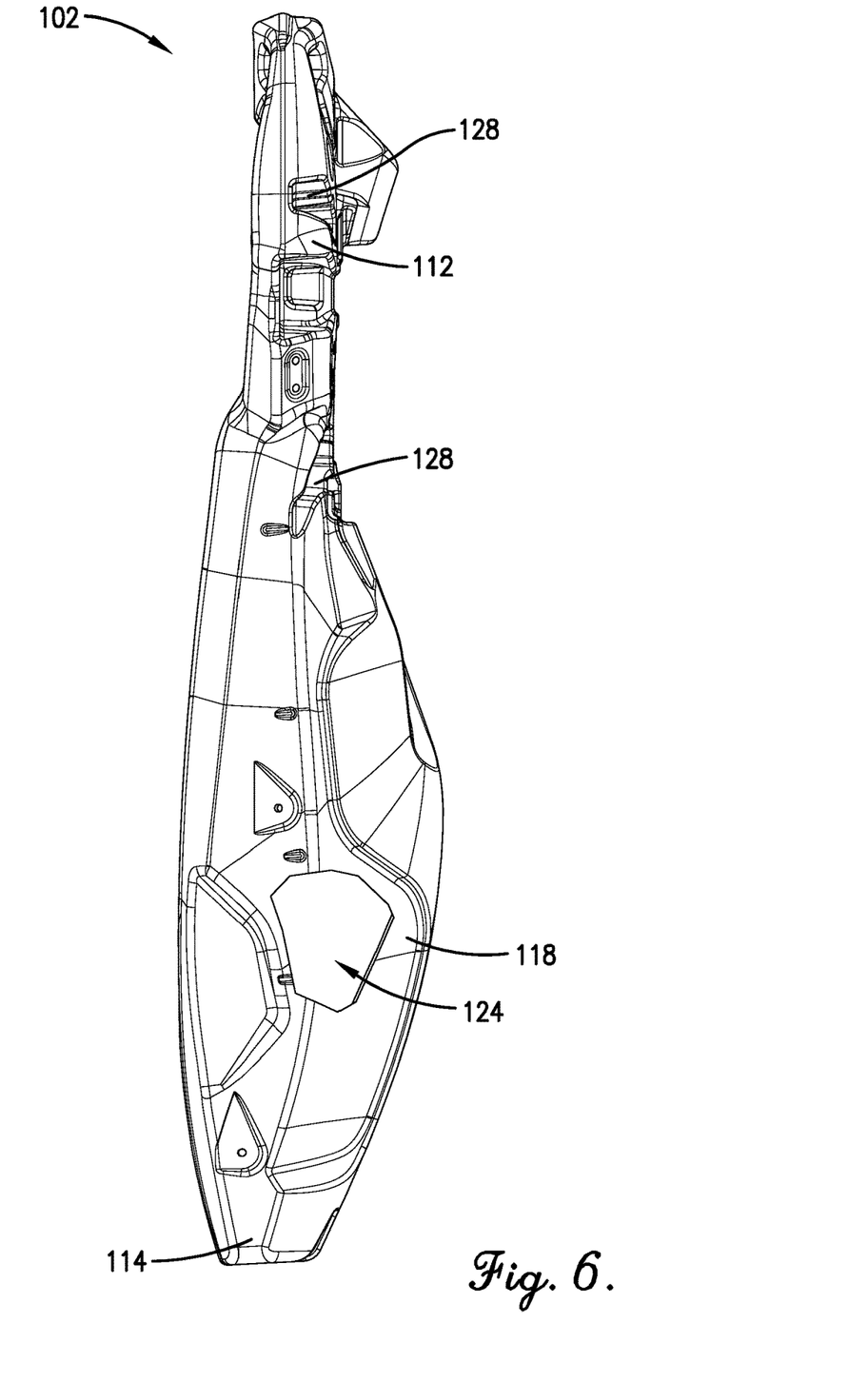
FIG. 6 is a side view of the of the molded body shown in FIGS. 4 and 5.

These and other features may be more readily understood with respect to the depicted embodiments shown in the figures. First, FIGS. 1-3 show a paramotor assembly 100 according to some embodiments of the disclosure. The paramotor assembly 100 generally includes a monolithic, non-metallic molded body 102 attached to a hoop 104 generally extending at least partially around the molded body 102 and coupled thereto via a plurality of spars 106 extending from the molded body 102 to the hoop 104. As used herein, "monolithic" is used to mean that more than one feature of the paramotor assembly 100 is integrally formed (i.e., molded) in the molded body 102 such as, in the depicted embodiment, a fuel tank and the supporting frame structure of the paramotor assembly 100, which will be discussed in more detail below. Put another way, monolithic in this instance is used to mean that the molded body 102 is of a "unibody" or "monocoque" construction. This can be contrasted to known paramotor assemblies, in which a metallic structural frame is constructed separate from a molded fuel tank and similar components, with each component ultimately bolted to or otherwise coupled to the metallic structural frame, which typically is a welded, tubular support structure or similar metallic frame.

The plurality of spars 106 each generally include an inner end 108 and an outer end 110. The inner end 108 of each spar 106 is coupled to the molded body 102, and the outer end 110 of each spar is coupled to the hoop 104. More particularly, the inner ends 108 of the spars are attached to the molded body 102 at spaced apart inner locations, and the outer ends 110 of the spars 106 are attached to the hoop 104 at spaced apart outer locations. In this regard, the spars 106 support the hoop 104 in a manner than is spaced apart from, but generally surrounding, the molded body 102. In some embodiments, the hoop 104 and spars 106 support a net (not shown) that generally separates a motor and propeller assembly (not shown) from a pilot, a pilot harness (not shown) and other components of the paramotor. As should be appreciated, the pilot harness allows the pilot to secure the paramotor assembly 100 to their back, while the motor and propeller assembly provides thrust for the paramotor assembly 100 during flight via a user-operated throttle (also not shown). The hoop 104, spars 106, and netting (when equipped) prevent the pilot and certain components of the paramotor assembly 100 such as the paraglider wing and others from contacting the motor and propeller assembly during use which otherwise could result in damage or interfere with the flight of the paramotor assembly 100.

Figure 7:
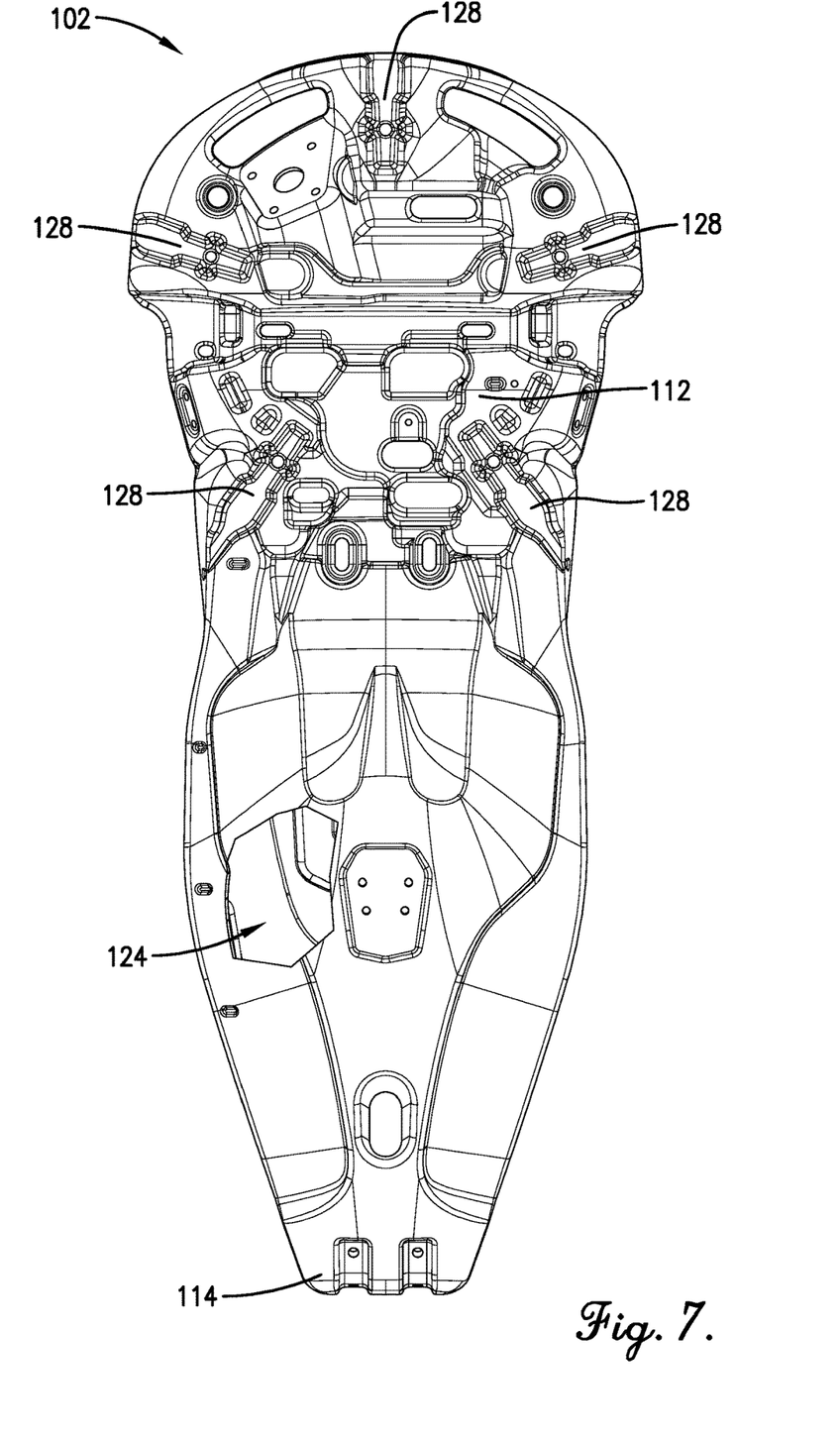
FIG. 7 is a back view of the molded body shown in FIGS. 4-6.
Figure 9:
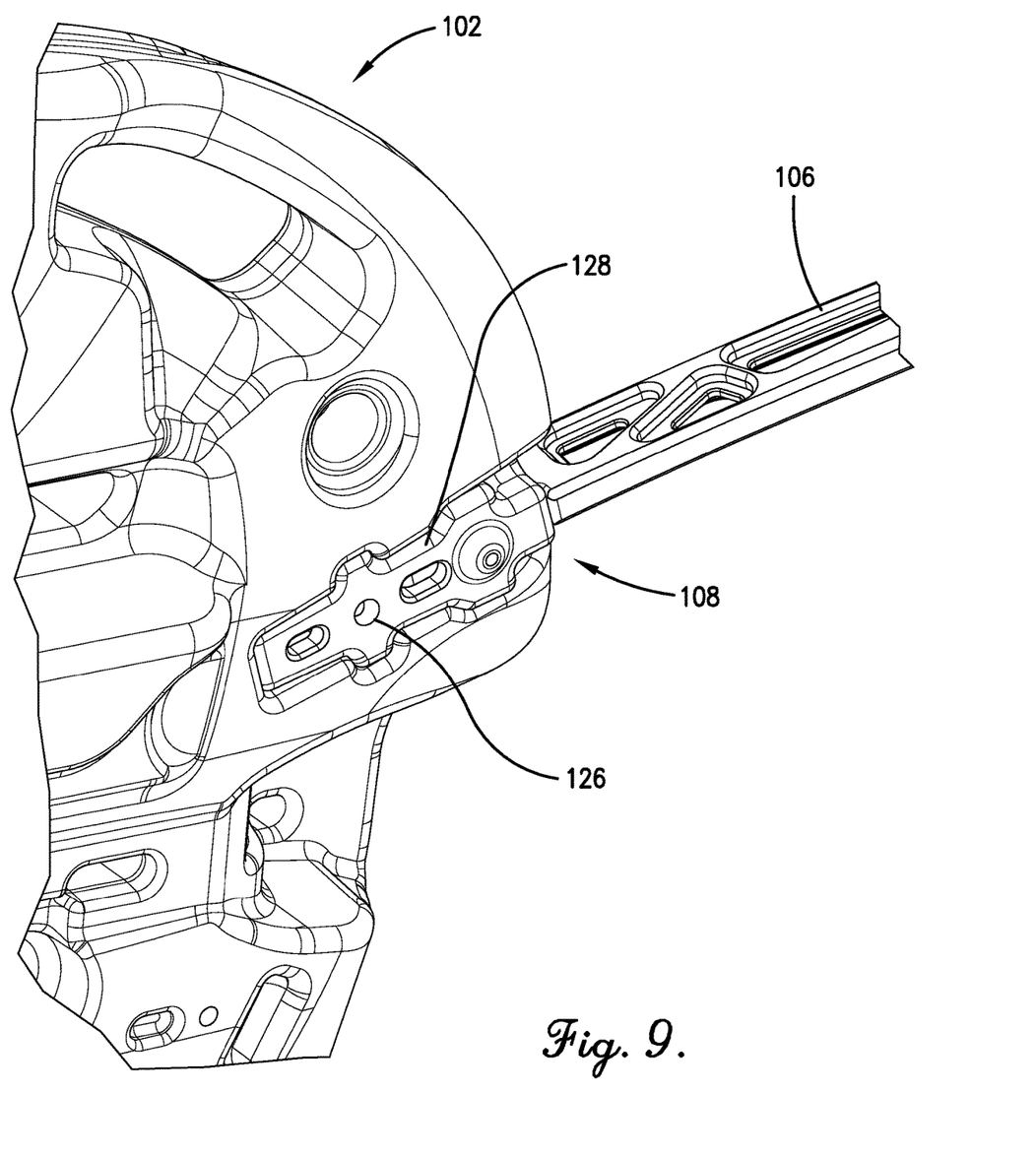
FIG. 9 is a partial rear-perspective view of the paramotor assembly shown in FIGS. 1-3 shown with certain components thereof removed in order to illustrate the details of a spar connection assembly.
Figure 10:
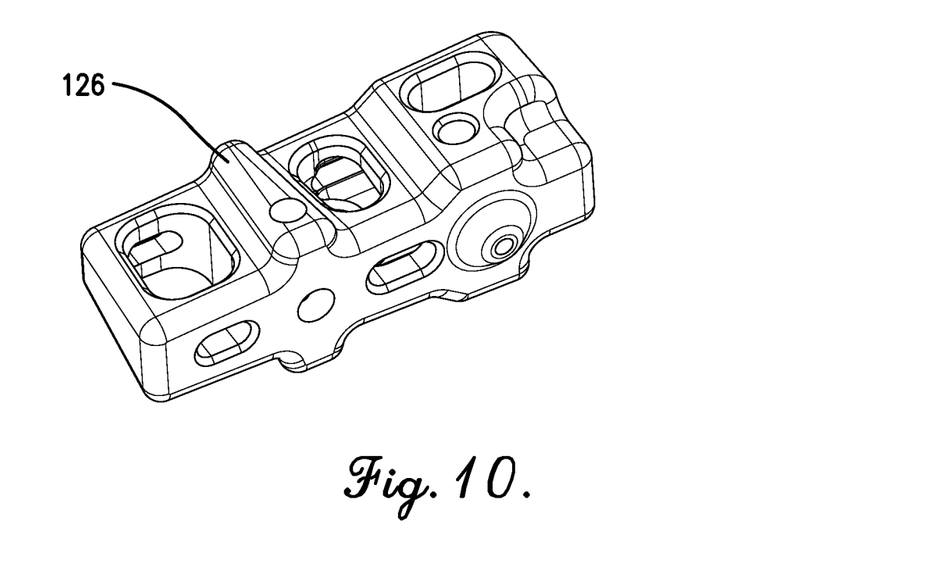
FIG. 10 is perspective view of a bracket used in the spar connection assembly shown in FIG. 9.
Figure 11:
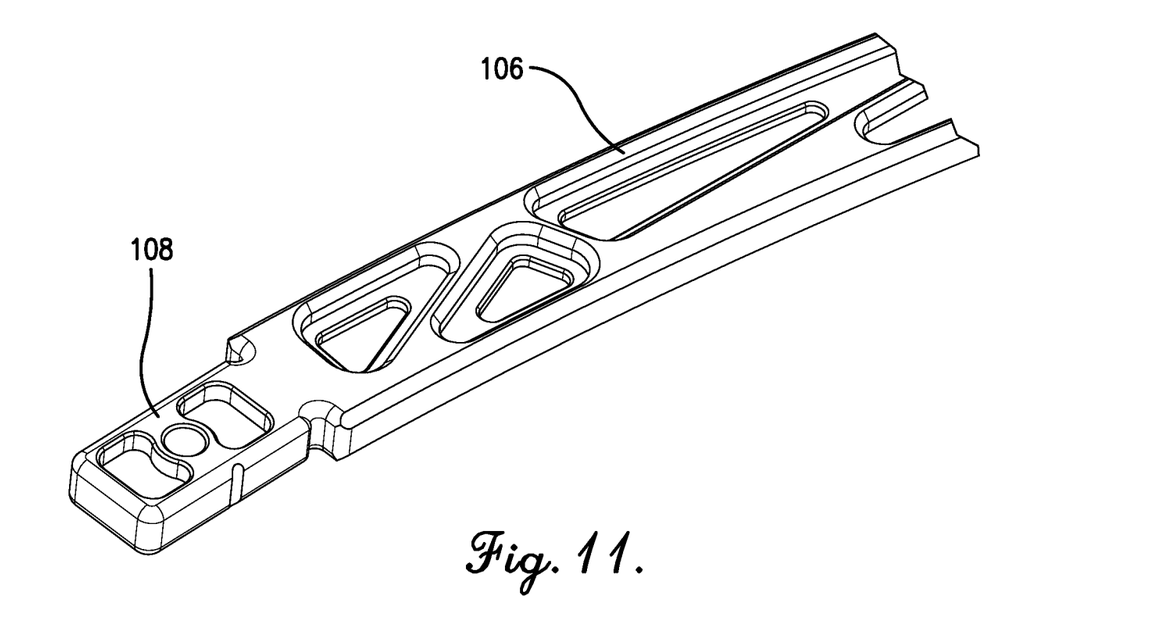
FIG. 11 is a partial perspective view of a spar used in the spar connection assembly shown in FIG. 9 and that is received by the bracket shown in FIG. 10.

The molded body 102 includes a plurality of spar mounts 128 (as best seen in FIGS. 7 and 9), each of which receives the inner end 108 of a respective spar 106. In this regard, the inner ends 108 of the plurality of spars 106 are spaced from one another and held in position relative to one another by the molded body 102. In some embodiments, the inner ends 108 of the spars 106 directly engage and/or contact the molded body 102 and are affixed thereto via a threaded fastener or similar fastening mechanism. In other embodiments, the paramotor assembly 100 may include one or more intermediate brackets or similar that receive the inner ends 108 of the plurality of spars 106, such as brackets 126 (FIGS. 9 and 10).

More particularly, as best seen in FIG. 7, in some embodiments the molded body 102 may include a plurality of spar mounts 128 integrally formed in a spaced apart fashion in a back of the molded body 102. In the depicted embodiment, the spar mounts 128 are generally formed in a radial array in a back portion of the molded body 102. Each of the spar mounts 128 may be shaped and configured to directly receive the inner end 108 of each spar 106, with or without a threaded fastener or the like thereafter used to secure the spars 106 in place. In other embodiments, the spar mounts 128 may be sized and shaped to receive an intermediate bracket 126 that in turn is sized and configured to receive the inner ends 108 of the spars 106 in a secure fashion. For example, and as best seen in FIG. 9, in such embodiments a corresponding bracket 126 is received in each spar mount 128 provided in the molded body 102, and the inner end 108 of the spar 106 is received within an interior of the bracket 126. The bracket 126 may be configured with a detent, catch, lock, latch or other securing mechanism such that the inner end 108 of the spar 106 and recesses thereon clicks into place and is held in a secure fashion in the bracket 126 even without the use of a threaded fastener or other fastening mechanism. Or the bracket 126 may include a threaded fastener or similar fastening mechanism in order to secure the spar 106, and more particularly the inner end 108 of the spar 106, into place either directly to the spar mount 128 or else the bracket 126, a s discussed.

In some embodiments, the molded body 102 is formed of a material that is more flexible than a material from which the spars 106 are formed. For known paramotors, a structural frame is formed from a metallic material such as steel, aluminum, or similar, and thus in such assemblies the frame will be as rigid or more rigid than the spars attached thereto. In contrast, the molded body 102 described herein is formed from a more flexible material than the metallic or other material used to form the spars 106, which may reduce weight, provide enhanced crash resistance, allow for more aerodynamic shapes, among other benefits. Additionally or alternatively, in some embodiments the molded body 102 is formed of a material that has a lower density than the material from which the spars 106 are formed. For example, in some embodiments the spars 106 may be formed of steel, aluminum, or other metallic material, while the molded body 102 is formed of plastic or carbon fiber or other less dense and/or more flexible material than the metallic material from which the spars 106 are formed.

In some embodiments, by utilizing the monolithic, non-metallic, molded body 102, many (in some cases, all) of the metallic welds used in connection with traditional paramotor assemblies and frames are eliminated, thereby increasing the structural integrity of the paramotor assembly and/or reducing the weight of the paramotor assembly. For example, in some embodiments the total weight of metallic welds included on the paramotor assembly 100 is less than 10, 5, 2, 1, 0.5, or 0.1 percent of the combined weight of the hoop 104, spars 106, and molded body 102.

The paramotor assembly 100 may include additional flight components and controls without departing from the scope of the disclosure. For example, in addition to the motor and propeller assembly, netting, paraglider wing, and other components discussed above (each not shown for simplicity, but which should be readily appreciated by one skilled in the art), the paramotor assembly 100 may include a pair of swing arm assemblies 116. The swing arm assemblies 116 may be removably coupled to the molded body 102 and serve as an attachment point for risers of the paraglider wing and other components. At a high level, the swing arm assemblies 116 provide an attachment point for the paraglider wing and allow a pilot to steer and otherwise control the paramotor assembly 100 during flight. In some embodiments, the swing arm assemblies may be fully articulable and adjustable to give a pilot customizable and more enhanced control of the paramotor assembly 100. Details of one embodiment of fully articulable and adjustable swing arm assemblies 116 that could be utilized with the paramotor assembly 100 of the instant disclosure are provided in U.S. Pat. No. 10,562,621, titled "PARAMOTOR FULLY ARTICULATED/ADJUSTABLE SWING ARM SYSTEM AND HOOP TENSIONER SYSTEM," issued on Feb. 18, 2020, to Glidersports, Clinton, Mo., which is hereby incorporated in its entirety.

In some embodiments, the molded body 102 is sized and configured to provide enhanced stability, weight distribution, and other benefits as compared to an external, metallic structural frame. This may be understood with reference to FIG. 2. As seen in FIG. 2, the molded body 102 includes a maximum dimension, which in this embodiment is the height (H) of the molded body 102. The hoop 104 also includes a maximum dimension, which in this embodiment is the diameter (D) of the hoop 104. In this embodiment the maximum dimension (e.g., height, H) of the molded body 102 is relatively long as compared to the maximum dimension (e.g., diameter, D) of the hoop 104. For example, in some embodiments the maximum dimension of the molded body 102 is greater than half the maximum dimension of the hoop 104. In other embodiments, the height (H) of the molded body 102 is at least 40, 50, 55, or 60 percent of the diameter (D) of the hoop 104. In other suitable embodiments, the hoop 104 and/or molded body 102 may be otherwise sized without departing from the scope of the disclosure including, e.g., embodiments in which the height (H) of the molded body is less than 40 percent of the diameter (D) of the hoop 104. Moreover, in some embodiments the hoop 104 may be, e.g., at least 1200 mm, 1300 mm, 1400 mm, 1500 mm, 1600 mm, or more in diameter (D). More particularly, in some embodiments the hoop 104 may be, e.g., 1650 mm or more in diameter (D). In such embodiments, the height (H) of the molded body 102 may be more or less than 40 percent of the diameter (D) of the hoop 104 depending on the desired configuration.

In such embodiments, the molded body 102 not only serves as the primary structural component of the paramotor assembly 100 and as the fuel tank 118 (which will be discussed in more detail below), but the molded body 102 also serves to support the paramotor assembly 100 when resting on the ground and provides appropriate weight distribution and other benefits on the ground and in flight. For example, in some embodiments the molded body 102 generally includes an upper portion 112 and a base 114. The upper portion 112 includes the mounting location for various flight control components such, without limitation, the swing arm assemblies 116, the motor via one or more motor mounts provided on a back of the molded body 102, a pilot harness via one or more harness mounts provided on a front of the molded body 102, and other components. Notably, the spars 106 are coupled to the molded body 102 via the upper portion 112. That is, the upper portion 112 includes the plurality of spar mounts 128 used to receive the inner end 108 of each of the spars 106 at spaced apart (e.g., radially arrayed) inner locations.

The base 114 of the molded body 102 extends downward from the upper portion 112 of the molded body. That is, the base 114 extends downward and below a lowest portion of the hoop 104 when the paramotor assembly 100 is in a vertical, or in-use, position, as best in FIGS. 2 and 3. In this regard, the base 114 can be used to support the paramotor assembly 100 in an upright configuration on a horizontal surface. In some embodiments wear plates, feet, or other components may be attached to the base 114 and/or the hoop 104 in order to contact the horizontal surface when the paramotor assembly 100 is resting thereon. For example, in one embodiment the base 114 may include a first pair of spaced-apart feet coupled to a lowermost face of the base 114, and the hoop 104 may include a second pair of spaced-apart feet coupled near a lowest portion of the hoop 104. In such embodiments, the paramotor assembly 100 may be supported on a horizontal surface first by resting the base 114 (and thus the first pair of spaced-apart feet coupled thereto) on the horizontal surface, and then titling the paramotor assembly 100 slightly backwards until the second pair of spaced-apart feet provided on the hoop 104 contact the horizontal surface.

Again, in some embodiments the monolithic, molded body 102 may integrally include a fuel tank 118. This may be best understood with reference to FIGS. 4-8, which show the molded body 102 with all external components typically attached thereto (i.e., flight controls, swing arm assemblies 116, motor mounts, stiffening plates, etc.) removed. As can be seen, in this embodiment the molded body 102 is a continuous piece of plastic, carbon fiber, or other similar, non-metallic material that is sufficiently rigid to provide the main structural support for the paramotor assembly 100. The molded body 102 may include various recesses, channels, troughs, and other integrally formed features to receive various components of the paramotor assembly 100. For example, in addition to the recesses forming the spar mounts 128 discussed above, the molded body may include recesses or pockets to receive a battery if the paramotor assembly 100 is provided with an electric start or electric motor, recesses forming handholds or handles used to move the paramotor assembly 100 when not strapped to a pilot, recesses or channels to receive the swing arm assemblies 116, and various other recesses and integrally formed features.

Figure 8:
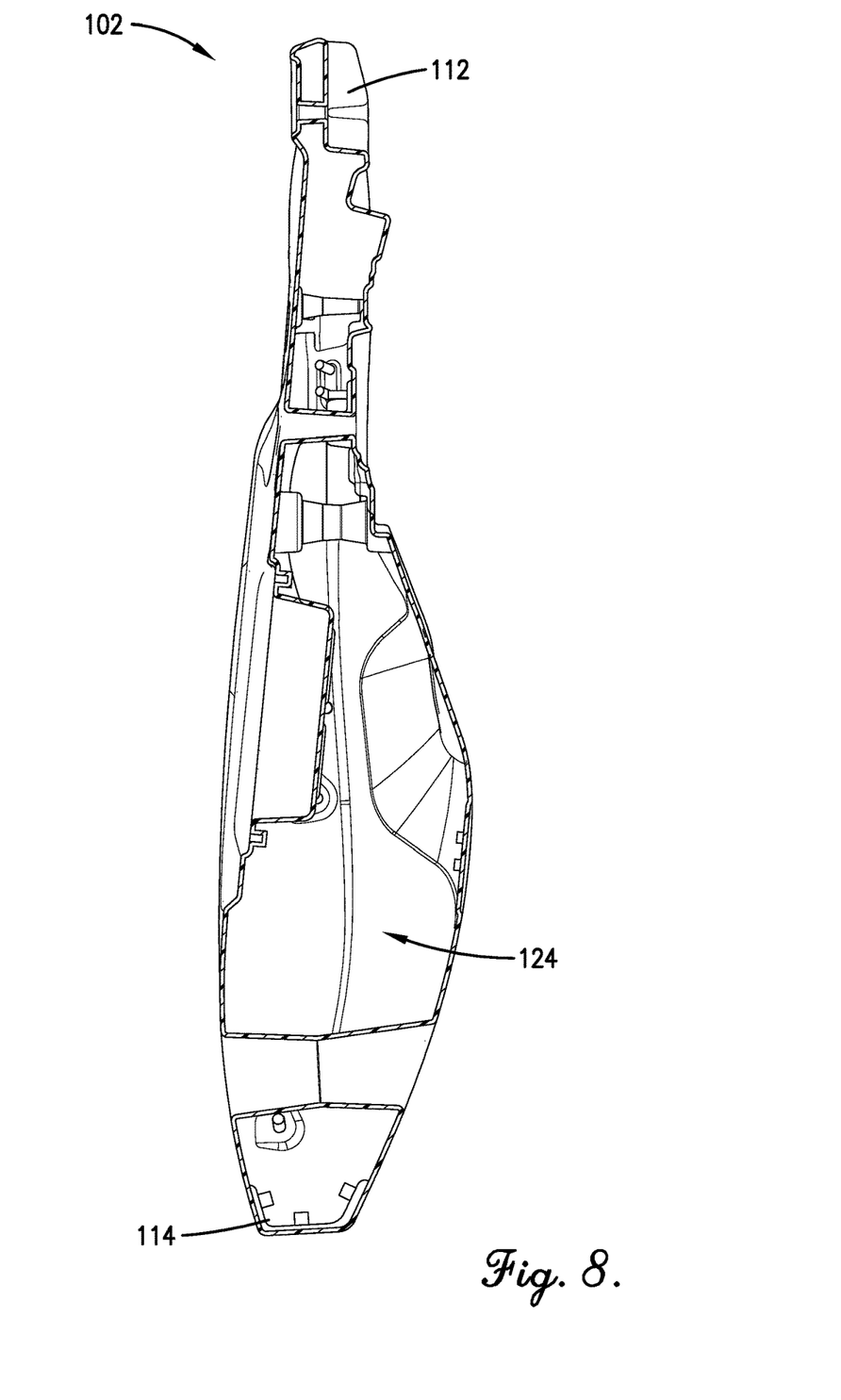
FIG. 8 is a cross-sectional view of the molded body shown in FIGS. 4-7, viewed along line 8-8 in FIG. 5.

In this embodiment, the outer walls of the molded body 102 enclose an internal liquid holding volume 124, best seen in the sectional view shown in FIG. 8. In some embodiments, this internal liquid holding volume 124 houses a liquid used to operate the paramotor assembly 100 such as, in one non-limiting example, fuel used by the motor. More particularly, in some embodiment the fuel tank 118 is at least partially formed by the molded body 102. That is, the internal liquid holding volume 124 serves as the fuel tank 118 for the paramotor assembly 100. This may beneficially reduce weight and complexity of the paramotor assembly by not requiring a separate, externally mounted fuel tank as is the case with traditional paramotor frames.

In other embodiments, the paramotor assembly 100 may include a separate (i.e., non-integral) fuel tank 118 that is received at least partially within the molded body 102 and, more particularly, at least partially within the internal liquid holding volume 124 of the molded body 102. For example, in some embodiments the molded body 102 may be formed around a metallic fuel tank 118 or similar such that the fuel tank 118 is enclosed by the outer walls of the molded body 102 after manufacture. In other embodiments, the paramotor assembly 100 may include a bladder or other flexible component that serves as the fuel tank 118 and that is inserted into the molded body 102 after formation such as, for example, through a fuel-fill opening provided in the upper portion 112 of the molded body 102.

By incorporating and/or enclosing the fuel tank 118 in the molded body 102, the paramotor assembly 100 may reduce weight and complexity as compared to known paramotor assemblies, may improve the aerodynamics of the frame and paramotor assembly 100 more generally, and, in some embodiments, may increase fuel capacity of the paramotor assembly 100. For example, by using the internal holding volume 124 as the fuel tank 118, the paramotor assembly 100 may hold up 1 to 10, 2 to 8, 3 to 7, 4 to 5, or about five U.S. gallons of fuel.

Moreover, by using the internal liquid holding volume 124 as the fuel tank 118 or else by housing the fuel tank 118 in the internal liquid holding volume 124, the weight of the liquid (e.g., fuel) carried by molded body 102 is beneficially positioned near the base 114 thereof, which may provide increased stability both on the ground and in-flight as well as other aerodynamic benefits. More particularly, a radial distance (R) is defined between a central hoop axis 120 and a lowest edge of the hoop 104 as shown in FIG. 3. In some embodiments, a center of gravity of the internal liquid-holding volume 124 is spaced less than 0.4 R, 0.3 R, 0.25 R, 0.2 R, 0.15 R, or 0.15 R from the lowest edge of the hoop 104.

Additional aspects of the disclosure are directed to a method or making or manufacturing a paramotor assembly, such as the paramotor assembly 100 shown in FIGS. 1-11. The method may include molding a monolithic molded body, such as molded body 102, from a non-metallic material. Again, this non-metallic material may be any suitable material and, in some embodiments, may be plastic or carbon fiber. Also, in some embodiments the material used to mold the body may be more flexible and/or less dense than the material used to form a plurality of spars of the paramotor assembly, such as the plurality of spars 106. The body may be molded using any suitable molding technique such as, without limitation, roto-molding, blow molding, carbon fiber layup, additive manufacturing or 3D printing, or other process.

The method may also include attaching inner ends of a plurality of spars, such as the plurality of spars 106, to the molded body, such as the molded body 102, at spaced apart inner locations. Returning to the above example, this may include attached inner ends 108 of the plurality of spars 106 to recessed spar mounts 128 radially arrayed in an upper portion 112 of the molded body 102, either directly, with the use of a threaded connector or the like, and/or via a plurality of intermediate brackets 126 received within the recessed spar mounts 128.

The method may also include attaching outer ends of the plurality of spars to a hoop at spaced apart outer locations. Again, returning to the above example, this step may include attaching the outer ends 110 of the spars 106 to the hoop 104, such that each spar extends from the molded body 102 to the hoop 104 thereby supporting the hoop 104 in such a manner that it at least partially surrounds the molded body 102. By constructing a paramotor assembly in such a manner, the paramotor assembly may exhibit some or all of the benefits described above including, without limitation, allowing the paramotor to carry more fuel or batteries, allowing for geometries not possible in traditional paramotor frames, providing a molded body formed of a material that is flexible enough to absorb substantial impacts without breaking, thereby increasing crash resistance, and other manufacturing and performance related benefits.

The various components may be formed using any suitable manufacturing process and, in some embodiments, are machined via CNC methods using raw materials, through a plastic/metal molding process such as roto-molding or blow molding, by carbon fiber or other material layup, via additive manufacturing, or by bending and welding various prefabricated components such as metal tubing. Moreover, the embodiments of the invention have been described herein to be illustrative rather than restrictive. Alternative embodiments will become apparent to readers of this disclosure. Further, alternative means of implementing the aforementioned elements and steps can be used without departing from the scope of the claims, as would be understood by one having ordinary skill in the art. Certain features and sub-combinations are of utility and may be employed without reference to other features and sub-combinations, and are contemplated as within the scope of the claims.

The invention claimed is:

1. A paramotor assembly comprising:
   a monolithic, non-metallic molded body;
   a hoop extending at least partially around the molded body; and
   a plurality of spars coupling the hoop and the molded body,
   wherein each of the spars includes an inner end coupled to the molded body and an outer end coupled to the hoop,
   wherein the inner ends of the spars are spaced from one another and held in position relative to one another by the molded body.

2. The paramotor assembly of claim 1, wherein the molded body is formed of a material that is more flexible than a material from which the spars are formed.

3. The paramotor assembly of claim 1, wherein the molded body is formed of a material having a lower density than a material from which the spars are formed.

4. The paramotor assembly of claim 1, wherein the molded body is formed of plastic, carbon fiber, synthetic and/or composite fiber layup and/or weave structures, glass-reinforced plastic (GRP), and/or 3D fiber-reinforced printed structures.

5. The paramotor assembly of claim 1, wherein the paramotor assembly comprises metallic welds in an amount of less than 10 percent based on the combined weight of the hoop, the spars, and the molded body.

6. The paramotor assembly of claim 1, wherein a maximum dimension of the molded body is greater than half of a maximum dimension of the hoop.

7. The paramotor assembly of claim 1, wherein the hoop has a diameter (D) and the molded body has a height (H), wherein H is at least 40 percent of D.

8. The paramotor assembly of claim 1, wherein the molded body comprises an upper portion and a lower base, wherein the spars are coupled to the upper portion, and wherein the lower base extends to or below a lowest portion of the hoop when the paramotor assembly is in a vertical, in-use position so that the lower base can be used to support the paramotor assembly in an upright configuration on a horizontal surface.

9. The paramotor assembly of claim 1, further comprising a motor, a swing arm assembly, and a pilot harness, each coupled to the molded body.

10. The paramotor assembly of claim 1 further comprising a fuel tank that is at least partially received within the molded body.

11. The paramotor assembly of claim 1 further comprising a fuel tank that is at least partially formed by the molded body.

12. The paramotor assembly of claim 1 further comprising a fuel tank that is at least partially received within the molded body or that is at least partially formed by the molded body, wherein the hoop defines a central hoop axis and a lowest hoop edge, wherein the fuel tank is configured such that a center of gravity of an internal liquid-holding volume of the fuel tank is located closer to the lowest hoop edge than the central axis.

13. The paramotor assembly of claim 12, wherein a radial distance (R) is defined between the central hoop axis and the lowest hoop edge, wherein the center of gravity of the internal liquid-holding volume of the fuel tank is spaced less than 0.4 R from the lowest hoop edge.

14. A unibody frame for a paramotor assembly, the unibody frame comprising:
a monolithic, non-metallic molded body having an upper portion, a base disposed below the upper portion when the molded body is in an upright configuration, and an internal liquid-holding volume,
wherein the upper portion of the molded body includes a plurality of radially arrayed recesses configured to receive inner ends of a plurality of spars such that, when the inner ends of the plurality of spars are received in the plurality of recesses, the inner ends of the spars are spaced from one another and held in position relative to one another by the molded body, and
wherein the internal liquid-holding volume is configured to serve as a fuel tank for the paramotor assembly.

15. The unibody frame of claim 14, wherein the molded body is formed of plastic, carbon fiber, synthetic and/or composite fiber layup and/or weave structures, glass-reinforced plastic (GRP), and/or 3D fiber-reinforced printed structures.

16. The unibody frame of claim 14, wherein the molded body is configured to provide structural support for the paramotor assembly.

17. The unibody frame of claim 15, wherein the internal liquid-holding volume is configured to hold 2 to 8 U.S. gallons of fuel.

18. A method of making a paramotor assembly, the method comprising:
(a) molding a monolithic molded body from a non-metallic material;
(b) attaching inner ends of a plurality of spars to the molded body at spaced apart inner locations; and
(c) attaching outer ends of the plurality of spars to a hoop at spaced apart outer locations.

19. The method of claim 18, wherein the non-metallic material comprises plastic, carbon fiber, synthetic and/or composite fiber layup and/or weave structures, glass-reinforced plastic (GRP), and/or 3D fiber-reinforced printed structures.

20. The method of claim 18 wherein the attaching of step (b) is carried out via at least one of a threaded fastener or a bracket.

* * * * *